United States Patent
Annau et al.

(10) Patent No.: US 9,685,198 B1
(45) Date of Patent: Jun. 20, 2017

(54) SYNCHRONIZING RECORDINGS BASED ON AN ENCODED AUDIO SIGNAL

(71) Applicant: Jaunt Inc., Palo Alto, CA (US)

(72) Inventors: Thomas M. Annau, Palo Alto, CA (US); Michael Hill, Palo Alto, CA (US)

(*) Notice: Subject to any disclaimer, the term of this patent is extended or adjusted under 35 U.S.C. 154(b) by 0 days.

(21) Appl. No.: 15/164,467

(22) Filed: May 25, 2016

Related U.S. Application Data

(60) Provisional application No. 62/166,359, filed on May 26, 2015.

(51) Int. Cl.

| | | |
|---|---|---|
| *H04N 9/80* | (2006.01) | |
| *H04N 5/92* | (2006.01) | |
| *G11B 27/00* | (2006.01) | |
| *G11B 27/28* | (2006.01) | |
| *G10L 19/008* | (2013.01) | |
| *G10L 19/018* | (2013.01) | |
| *G11B 27/031* | (2006.01) | |
| *H04N 5/94* | (2006.01) | |
| *H04N 9/88* | (2006.01) | |

(52) U.S. Cl.
CPC ............ *G11B 27/28* (2013.01); *G10L 19/008* (2013.01); *G10L 19/018* (2013.01); *G11B 27/031* (2013.01)

(58) Field of Classification Search
CPC .. H04N 9/80; H04N 5/92; H04N 5/94; H04N 9/88; G11B 27/00
USPC .................................. 386/241, 239, 252, 257
See application file for complete search history.

(56) References Cited

U.S. PATENT DOCUMENTS

| | | | |
|---|---|---|---|
| 8,131,389 B1 * | 3/2012 | Hardwick ............ | G11B 27/002 700/94 |
| 2002/0095613 A1 * | 7/2002 | Matsuoka ............. | H04J 3/0632 713/400 |
| 2003/0011627 A1 * | 1/2003 | Yager ........................ | G06F 3/14 715/700 |

\* cited by examiner

*Primary Examiner* — Daquan Zhao
(74) *Attorney, Agent, or Firm* — Burbage Law, P.C.; Jon-Michael Burbage

(57) ABSTRACT

The method may include generating an encoded audio signal. The method may include receiving metadata from a user about an event. The method may also include generating a unique identifier (ID) that is associated with the metadata. The method may also include providing the metadata and the unique ID to a database. The method may also include encoding the unique ID in an audio signal using a robust signal modulation scheme. The method may also include playing, using a mobile device, the audio signal, where the audio signal is played within an audible detection range of recording devices configured to record the audio signal.

20 Claims, 9 Drawing Sheets

SYNCHRONIZING RECORDINGS BASED ON AN ENCODED AUDIO SIGNAL

CROSS-REFERENCE TO RELATED APPLICATIONS

This application claims the benefit of U.S. Provisional Application No. 62/166,359, filed May 26, 2015, titled "Grouping Recordings Based on an Encoded Audio Signal," the entirety of which is herein incorporated by reference.

BACKGROUND

The specification relates to synchronizing recordings based on an encoded audio signal.

Multiple audio and video recordings of an event may be captured using different recording devices. For example, a scene for a movie may be captured using multiple video cameras to capture different angles and a microphone to capture the audio. Because the recordings may start at different times, it may be difficult to synchronize the recordings. Synchronization may be particularly important when the recordings are used to generate three-dimensional videos or multi-channel audio because any misalignment would result in an unpleasant user experience.

This problem may be exacerbated when the recording devices are reset because the process of resetting the recording devices may change the internal clocks for the recording devices. As a result, the recordings cannot be synchronized using a timestamp associated with each of the recordings because the timestamp may be inaccurate.

Another technique for synchronizing the recordings may be to send a time code to each of the recordings. Traditionally, each recording device was connected by a cable so that the time code was received by each recording device at the same time. More recently, the time code was sent out wirelessly, however, in order for this to work each recording device has to have a strong wireless signal to receive the time code at the right time.

SUMMARY

The disclosure includes a system for grouping recordings based on an encoded audio signal. The system may include a mobile device, a central server, and recording devices. The mobile device may include an audio generator application that is configured to generate a unique identifier (ID) and associated the unique ID with metadata. The audio generator application may transmit the unique ID and the metadata to the central server where the central server indexes the metadata based on the unique ID. The audio generator application may encode the unique ID in an audio signal. The mobile device may play an audio track that includes the audio signal for the recording devices within an audible detection range of the recording devices.

The recording devices may record the audio track as part of their recordings. Once the recordings are completed, the recording devices may transmit the recordings to the central server. The recording devices may include any device capable of recording, such as a video recorder, a microphone, a mobile device, and a camera.

The central server includes a synchronization application and a database. The synchronization application receives the unique ID and the metadata from the audio generator application. The synchronization application designates the unique ID received from the audio generator application as a primary key for the database. The database indexes the metadata based on the unique ID.

The synchronization application receives recordings from the recording devices. The synchronization application determines the unique ID from the audio signal in the recordings. The synchronization application determines that a primary key matches the unique ID and groups the recordings based on the match. For example, the synchronization application instructs the database to index the recordings based on determining the match between the primary key and the unique ID.

The synchronization application may synchronize the grouped recordings based on the audio track. For example, where the mobile device plays one audio track, the synchronization application synchronizes the recordings based on the one audio track. In some embodiments, the mobile device plays multiple audio tracks. In this case, the audio generator application may reserve a portion of the audio signal that is encoded in the audio track as a counter and may modify the counter to represent an increase by one each time the audio signal is played. The synchronization application may synchronize the recordings based on a number represented by the counter.

According to one innovative aspect of the subject matter described in this disclosure, a system and method for generating an encoded audio signal is described. The method may include receiving metadata from a user about a recorded event. The method may also include generating a unique ID that is associated with the metadata. The method may also include providing the metadata and the unique ID to a database. The method may also include encoding the unique ID in an audio signal using a robust signal modulation scheme. The method may also include playing, using a mobile device, an audio track that include the audio signal, where the audio signal is played within an audible detection range of recording devices configured to record the audio signal.

According to another innovative aspect of the subject matter described in this disclosure, a system and method for grouping a set of recordings is described. The method may include receiving a unique ID and metadata associated with the unique ID. The method may also include designating the unique ID as a primary key in a database. The method may also include indexing the metadata in the database based on the unique ID. The method may also include receiving recordings from recording devices, the recordings including an audio track that encodes the unique ID. The method may also include determining the unique ID from the audio track in the recordings. The method may also include determining that the primary key matches the unique ID from the audio track in the recordings. The method may also include synchronizing the recordings based on the audio track.

According to another innovative aspect of the subject matter described in this disclosure, a system and method for grouping a set of recordings is described. The method may include associating a unique ID and metadata with the unique ID are received from a mobile device. The method may also include designating the unique ID as a primary key in a database. The method may also include receiving video recordings and an audio recording from recording devices where two or more of the video recordings and the audio recording include an audio track that comprises a bit sequence and where the bit sequence comprises the unique ID and a transmission counter. The method may also include determining the unique ID and the transmission counter from the bit sequence. The method may also include determining the primary key to match the unique ID. The method may also include two or more of the video recordings and the audio recording are associated with the primary key. The method may also include generating synchronized video recordings from the two or more video recordings and a synchronized audio recording based on a start of the audio track. The method may also include identifying left panoramic images from the synchronized video recordings. The method may also include generating a stream of left panoramic images by, for each particular time frame in the left panoramic images, stitching first image frames at the particular time frame to form a corresponding left panoramic image for the particular time frame. The method may also include identifying right panoramic images from the synchronized video recordings. The method may also include generating a stream of right panoramic images by, for each particular time frame in the right panoramic images, stitching second image frames at the particular time frame to form a corresponding right panoramic image for the particular time frame. The method may also include generating virtual reality content that includes the stream of left panoramic images, the stream of right panoramic images, and the audio data.

Other aspects include corresponding methods, systems, apparatus, and computer program products.

The subject matter described in the disclosure advantageously provides a way to capture an audio track in a high-noise environment by improving the ability to temporally localize an audio signal that is part of the audio track. In addition, the subject matter advantageously describes a way to group and synchronize recordings of the same event.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Figure 1:
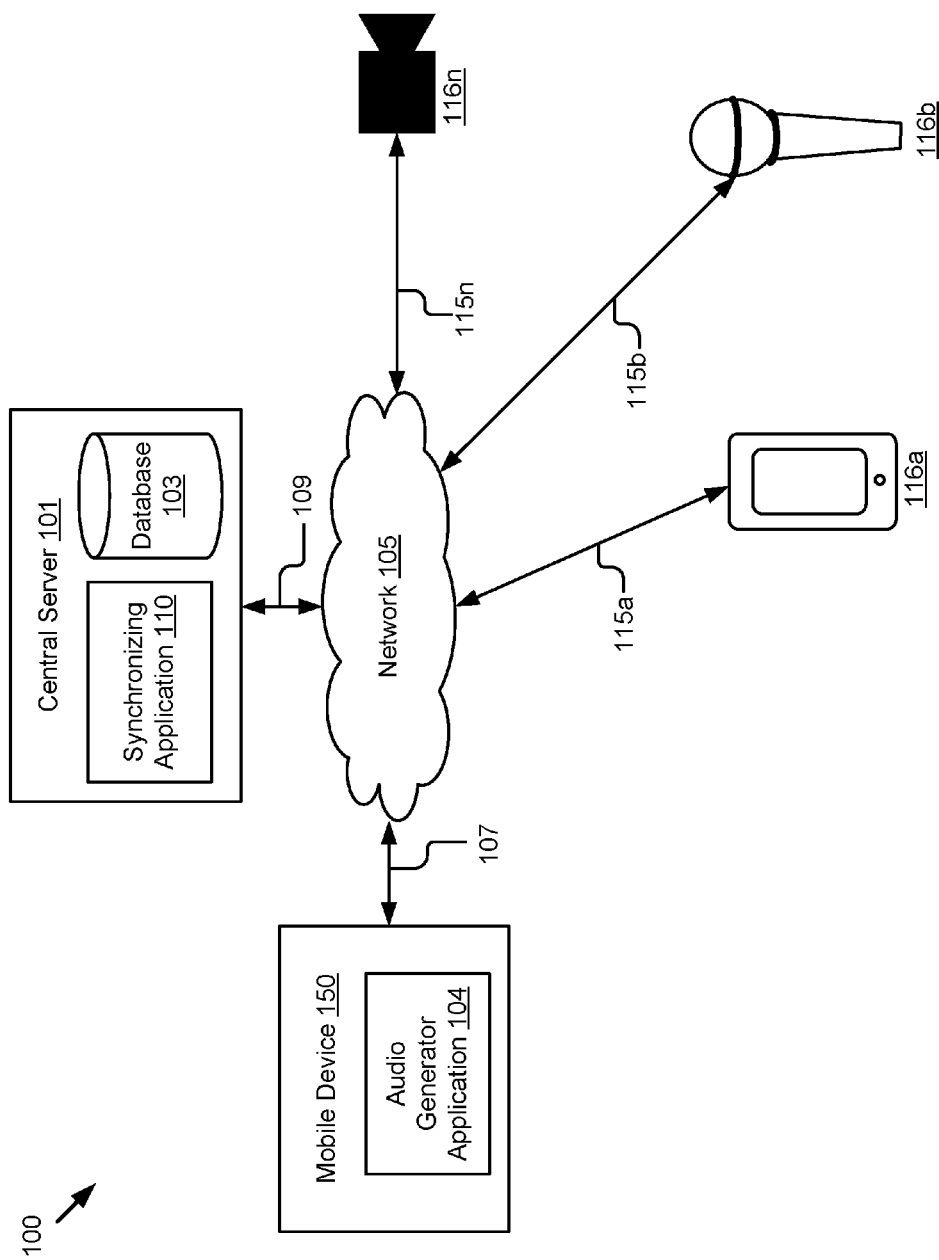
FIG. 1 is a block diagram illustrating an example system for grouping recordings.

FIG. 1 is a block diagram illustrating an example system 100 for grouping recordings. The system 100 may include a central server 101, a mobile device 150, and recording devices 116a, 116b, 116n.

The mobile device 150 is a portable computing device that includes a memory, a processor, a speaker, and network communication capabilities. For example, the mobile device 150 may include a smartphone, a smartwatch, a tablet computer, a personal computer, a laptop, a personal digital assistant (PDA), a mobile telephone, a mobile e-mail device, or other portable electronic device capable of accessing the network 105. The mobile device 150 may access the network 105 via signal line 107.

The mobile device 150 includes an audio generator application 104. The audio generator application 104 may be configured to receive metadata from a user about a recorded event. The recorded event may include, for example, a physical activity (e.g., skiing), a social event (e.g., a concert), a scripted event (e.g., a movie), or any other occurrence where capturing recordings at multiple angles or locations may be advantageous. The metadata may include a title, a scene, a take, a date, a location, a crew name, a cast name, and production notes.

The audio generator application 104 may generate a unique identifier (ID) that is associated with the metadata. The audio generator application 104 provides the metadata and the unique ID to a database. For example, the audio generator application 104 transmits the metadata and the unique ID over the network 105 to the central server 101.

The audio generator application 104 encodes the unique ID in an audio signal using a robust signal modulation scheme. The audio signal may be a 64-bit binary sequence. The robust signal modulation scheme may include a pseudorandom binary sequence, a random binary sequence, or audio frequency-shift keying. The audio generator application 104 may generate the pseudorandom binary sequence by assigning unique pseudorandom sequences to each bit for each position. For example, if the audio generator application 104 generates a 64-bit word, the audio generator application 104 may select either 0 and 1 to insert at each of the 64 positions in the 64-bit word.

The audio generator application 104 may encode the audio signal into an audio track. The mobile device 150 may play the audio track within an audible detection range of the recording devices 116a, 116b, 116n. In some embodiments, the recording devices 116a, 116b, 116n may be positioned in locations far enough away from each other that the mobile device 150 cannot play the audio track within an audible detection range of all of the recording devices 116a, 116b, 116n at the same time. For example, where the event is a concert and the recording device covers thirty feet of a stage, the recording devices 116a, 116b, 116n may not be able to detect the audio track at the same time. As a result, the audio generator application 104 may play the audio track repeatedly to ensure robust transmission and to allow time for the mobile device 150 to be transmitted to the recording devices 116a, 116b, 116n to be within the audible detection range to record the audio track.

In some embodiments where the mobile device 150 plays the audio track repeatedly, the audio generator application 104 may modify the audio signal. For example, where the audio signal is a 64-bit binary sequence (or 32-bit, 128 bit, etc.), the audio generator application 104 may reserve a part of the sequence to serve as a counter. Each time the mobile device 150 plays the audio track, the audio generator application 104 may modify the counter to represent an increase by one (or two, 10, etc.) each time the audio track is played. For example, the counter may be set to 0 for the first time the mobile device 150 plays the audio track, the counter may be set to 1 to represent a first retransmission, etc. As a result, when the audio tracks recorded by the different recording devices 116a, 116b, 116n are compared, the part of the sequence used to represent a counter may be used to synchronize the recordings. For example, if the mobile device 150 plays the audio tracks at a fixed time interval and a recording device 116 records a retransmission of the audio signal, a time of a first transmission may be calculated based on the counter and the fixed time interval.

In some embodiments, the audio generator application 104 may generate multiple audio markers to demarcate multiple locations in the recordings. For example, where the event is a movie, the audio markers may represent breaks between different scenes in the movie. The audio generator application 104 may generate a different audio signal to represent each audio marker. Alternatively, the audio generator application 104 may generate an audio signal with a unique part and a demarcation counter. The unique part may be associated with the same recording. The demarcation counter may represent a sequential number within the recording. For example, a movie with 10 scenes may have nine different demarcation numbers where the demarcation counter represents an increase by one for each demarcation in the recording.

The recording devices 116a, 116b, 116n are portable computing devices that each include a memory, a processor, and a microphone. For example, the recording devices 116 may include a video recorder, a microphone, a mobile device, and a camera that records video. Thus, some of the recording devices 116 may capture audio and some of the recording devices 116 may capture video and audio. The recording devices 116a, 116b, 116n may be coupled to the network 105 via signal lines 115a, 115b, and 115n, respectively.

The recording devices 116 record an audio track played by the mobile device 150. For example, the recording devices 116 may record the audio track at the beginning of the event, in the middle of the event, at end of the event, etc. The recording devices 116 generate recordings that include the audio track. The recording devices 116 provide the recordings to the central server 101 using the network 105. For example, the recording devices 116 may transmit the recordings wirelessly over the network 105 or over a hard-wired connection.

In some embodiments, the recording devices 116 may include code configured to provide a confirmation responsive to detecting the audio signal emitted by the mobile device 150. The confirmation may include a noise, an electronic message, etc. The audio generator application 104 may determine that the recording devices 116 are within audible range responsive to receiving the confirmation from the recording devices 116. In some embodiments, users of the recording devices 116 may ensure that they can detect the audio signal from the mobile device 150 so that the recordings recorded by the recording devices 116 are properly synchronized.

The central server 101 may be a hardware server that includes a processor, a memory, and network communication capabilities. The central server 101 may access the network 105 via signal line 109. The central server 101 includes a database 103 and a synchronization application 110. The database 103 may receive metadata and a unique ID. The database 103 may designate the unique ID as a primary key and index the metadata in the database based on the unique ID.

In some embodiments, the database 103 may index recordings from the recording devices 116 based on the unique ID. For example, as will be described in greater detail below, the database 103 may receive instructions from the synchronization application 110 to index the recordings based on the unique ID in an audio signal matching the primary key.

The synchronization application 110 may receive recordings from the recording device 116 where the recordings include an audio signal that includes the unique ID. The synchronization application 110 determines the unique ID from the audio signal in the recordings. For example, the synchronization application 110 may determine the unique ID from the audio signal by searching for the 64-bit sequence. The synchronization application 110 determines that the primary key matches the unique ID from the audio signal in the recordings. The synchronization application 110 may group the recordings to be associated with the primary key. For example, the synchronization application 110 may instruct the database 103 to index the recordings based on the unique ID. A user of the mobile device 150 may access the recordings stored on the central server 101 via the mobile device 150. Alternatively or additionally, a different user may access the recordings stored on the central server 101. For example, a user may access the recordings using a browser-based interface.

The synchronization application 110 may synchronize the recordings based on the timing of the audio signal. For example, where each recording device 116a, 116b, 116n records a single audio track that encodes the audio signal, the synchronization application 110 may determine the timing of each recording based on when the recordings include the audio track.

In embodiments where the mobile device 150 plays multiple audio tracks and the audio signal includes a counter that is modified to represent an increase by one each time an audio track is played again, the synchronization application 110 may synchronize the recordings based on a number represented by the counter. If the audio track is played at a fixed interval, the synchronization application 110 may determine a number represented by the counter for each of the recordings. For example, if a first recording includes a first audio signal with a counter that represents one and a second recording includes a first audio signal with a counter that represents two, the synchronization application 110 determines a time that elapsed between the mobile device 150 playing the first audio track and the second audio track. The synchronization application 110 then synchronizes the first and second recordings.

In embodiments where the recordings include multiple audio markers to demarcate multiple locations in the recordings, the synchronization application 110 may identify the multiple audio markers in the recordings. If the audio markers are represented by different audio signals, the synchronization application 110 may identify the different audio signals and determine the audio markers based on the different audio signals. If the audio markers are represented by audio signals with a unique part and a demarcation counter, the synchronization application 110 may identify the unique part and determine a number associated with the demarcation counter for each of the recordings.

Although the audio generator application 104 is illustrated as being stored on the mobile device 150, in some embodiments the central server 101 stores the audio generator application 104 and the mobile device 150 plays audio tracks received from the central server 101. Further variations are possible. For example, the synchronization application 110 may be stored on the mobile device 150 and the database 103 may receive instructions to index metadata from the mobile device 150. In some embodiments, the audio generator application 104 and the synchronization application 110 contain the same components and are configured to perform the same or similar functions.

The network 105 can include a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices may communicate. In some embodiments, the network 105 may include a peer-to-peer network. The network 105 may also be coupled to or include portions of a telecommunications network for sending data in a variety of different communication protocols. In some embodiments, the network 105 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, etc. In some embodiments, the network 105 may include a global positioning system (GPS) satellite for providing GPS navigation to the mobile device 150. In some embodiments, the network 105 may include a GPS satellite for providing GPS navigation to the mobile device 150. The network 105 may include a mobile data network for example, 3G, 4G, long-term evolution (LTE), Voice-over-LTE ("VoLTE"), or other mobile data network or combination of mobile data networks.

Figure 2A:
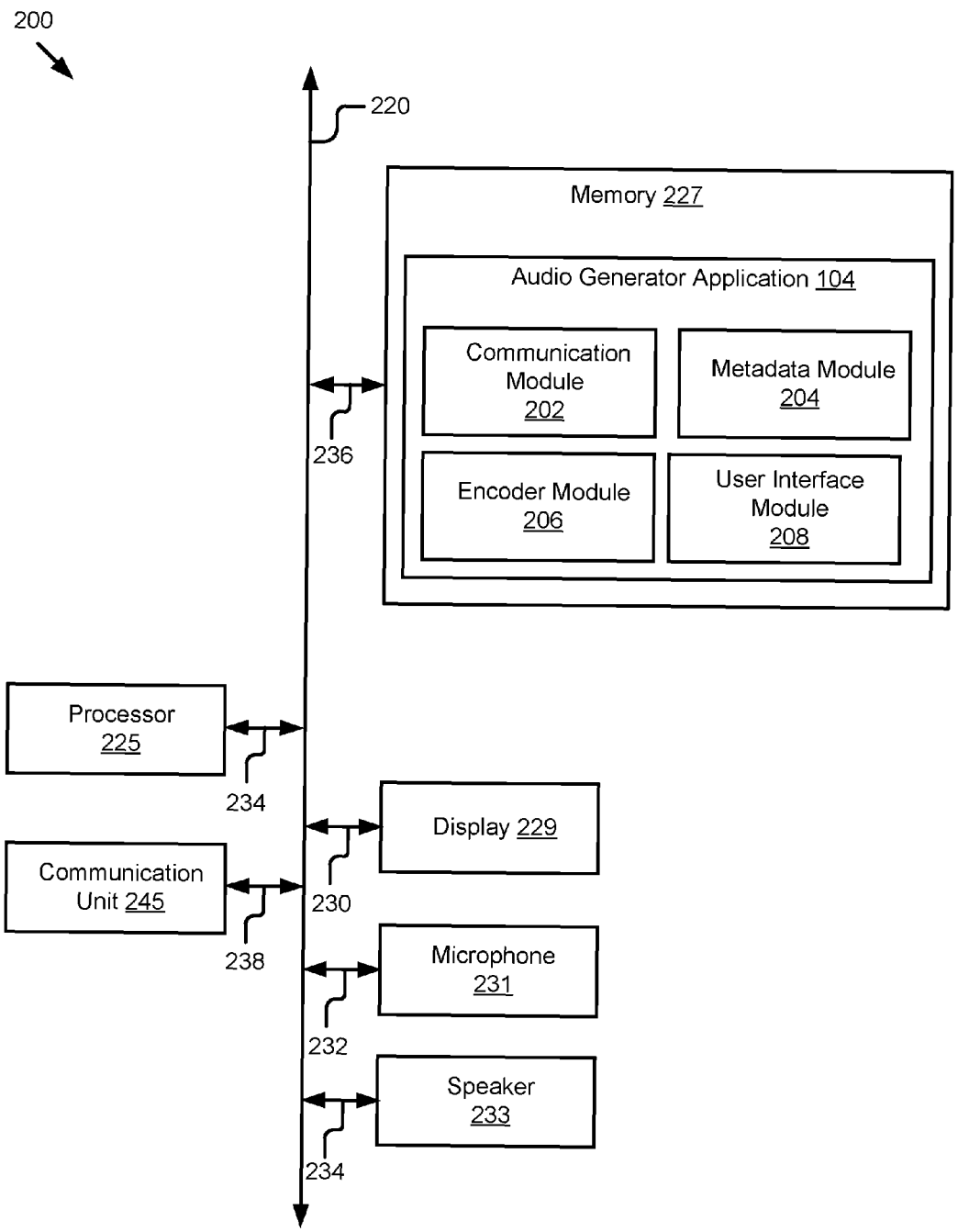
FIG. 2A is a block diagram of a device for generating audio tracks.

FIG. 2A is a block diagram of a device 200 for generating audio tracks. The device 200 can be, or include, or be included in the mobile device 150 of FIG. 1. In some embodiments, the device 200 may include a special-purpose computing device configured to provide some or all of the functionality described below with reference to FIG. 2A.

FIG. 2A can include a processor 225, a memory 227, a display 229, a microphone 231, a speaker 233, a communication unit 245, and an audio generator application 104. The processor 225, the memory 227, the display 229, the microphone 231, and the communication unit 245 are communicatively coupled to the bus 220.

The processor 225 includes an arithmetic logic unit, a microprocessor, a general-purpose controller, or some other processor array to perform computations and provide electronic display signals to a display device. The processor 225 processes data signals and may include various computing architectures including a complex instruction set computer (CISC) architecture, a reduced instruction set computer (RISC) architecture, or an architecture implementing a combination of instruction sets. Although FIG. 2A includes a single processor 225, multiple processors 225 may be included. Other processors, operating systems, sensors, displays, and physical configurations may be possible. The processor 225 is coupled to the bus 220 for communication with the other components via signal line 234.

The memory 227 stores instructions or data that may be executed by the processor 225. The instructions or data may include code for performing the techniques described herein. The memory 227 may include a dynamic random access memory (DRAM) device, a static random access memory (SRAM) device, flash memory, or some other memory device. In some embodiments, the memory 227 also includes a non-volatile memory or similar permanent storage device and media including a hard disk drive, a CD-ROM device, a DVD-ROM device, a DVD-RAM device, a DVD-RW device, a flash memory device, or some other mass storage device for storing information on a more permanent basis. The memory 227 is coupled to the bus 220 for communication with the other components via signal line 236.

The display 229 can include hardware for displaying graphical data from the audio generator application 104. For example, the display 229 renders graphics for displaying a user interface where a user may enter metadata and provide a request for an audio signal. The display 229 is coupled to the bus 220 via 230.

The microphone 231 may be an optional piece of hardware that includes hardware for detecting and/or recording audio. For example, in some embodiments, the recording devices 116 may emit a noise to confirm that they detected the audio signal provided by the mobile device 250. The microphone 231 may detect the noise emitted by the recording devices 116. The microphone 231 is coupled to the bus 220 via signal line 232.

The speaker 233 can include hardware for generating audio for playback. For example, the speaker 233 receives instructions from the audio generator application 104 to generate audio to transmit the audio signal. In some embodiments, the speaker 233 may provide audio at changing frequencies to convey meaning, such as when the audio generator application 104 is using audio frequency-shift keying. The speaker 233 is coupled to the bus 220 via signal line 234.

The communication unit 245 can include hardware that transmits and receives data to and from the mobile device 150. The communication unit 245 is coupled to the bus 220 via signal line 238. In some embodiments, the communication unit 245 includes a port for direct physical connection to the network 105 or to another communication channel. For example, the communication unit 245 includes a USB, SD, CAT-5, or similar port for wired communication with the device 200. In some embodiments, the communication unit 245 includes a wireless transceiver for exchanging data with the device 200 or other communication channels using one or more wireless communication methods, including IEEE 802.11, IEEE 802.16, Bluetooth®, or another suitable wireless communication method.

In some embodiments, the communication unit 245 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some embodiments, the communication unit 245 includes a wired port and a wireless transceiver. The communication unit 245 also provides other conventional connections to the network 105 for distribution of files or media objects using standard network protocols including TCP/IP, HTTP, HTTPS, and SMTP, etc.

The audio generator application 104 includes a communication module 202, a metadata module 204, an encoder module 206, and a user interface module 208.

The communication module 202 can include code and routines for handling communications. In some embodiments, the communication module 202 can include a set of instructions executable by the processor 225 to provide the functionality described below for handling communications. The communication module 202 may handle communications between the audio generator application 104 and other entities in the system 100 of FIG. 1, the audio generator application 104 and other components of the device 200, and components that are part of the audio generator application 104.

The metadata module 204 may be operable to generate metadata. In some embodiments, the metadata module 204 may include a set of instructions executable by the processor 225 to generate the metadata. In some embodiments, the metadata module 204 may be stored in the memory 227 of the computing device 200 and can be accessible and executable by the processor 225.

The metadata module 204 may automatically generate metadata that is associated with a recorded event. For example, the metadata module 204 may automatically generate metadata that includes a time that the audio signal is generated. In some embodiments, the metadata module 204 instructs the user interface module 208 to generate graphical data for displaying a user interface that accepts a request to generate an audio signal.

In some embodiments, the metadata module 204 instructs the user interface module 208 to generate a user interface that accepts user input. For example, the user may specify a title, a scene, a take, a date, a location, a crew name, a cast name, and production notes.

The encoder module 206 may be operable to generate a unique ID and encode it in an audio signal. In some embodiments, the encoder module 206 may include a set of instructions executable by the processor 225 to generate the unique ID and the audio signal. In some embodiments, the encoder module 206 may be stored in the memory 227 of the computing device 200 and can be accessible and executable by the processor 225.

The encoder module 206 generates a unique ID. The unique ID may be a 64-bit binary sequence or any other number of bits that is capable of transmitting information with enough variation to remain unique. For example, if the encoder module 206 generates 64-bit binary sequence, there are $2^{64}$ unique combinations available that include either 0 or 1 at each of the 64 positions. In cases where a greater number of combinations are needed, the binary sequence may be longer, such as a 128-bit binary sequence, which could be used to generate $2^{128}$ combinations. In some embodiments, where a portion of the binary sequence is reserved for additional information, such as a transmission counter that designates a number of transmissions of the audio signal, the number of combinations available for the unique ID may be fewer than $2^{64}$.

The pseudorandom sequences may improve temporal localization by superimposing a summation of the sequences for 0 and 1 at each bit position (or only 0 or 1 if particular bit values are fixed) so that identifying the audio signal entails searching for a 64-bit sequence. The encoder module 206 may enhance a robustness of the robust signal modulation scheme using error correction techniques, for example, those that include parity bits, cyclic redundancy checks, or Reed-Solomon codes.

The encoder module 206 may encode the unique ID in an audio signal using a robust signal modulation scheme. The encoder module 206 uses signal modulation by encoding the unique ID in a carrier wave by varying the instantaneous frequency of the carrier wave. The encoder module 206 selects the robust signal modulation scheme by selecting frequencies that are easily detectable. For example, the robust signal modulation scheme may include frequency-shift keying, which selects two frequencies: one that represents a binary 1 and one that represents a binary 0. For example, where the unique ID is 0101010101010101010101010101010101010101-01010101010101010101, the encoder module 206 encodes the unique ID as an audio signal that switches between two frequencies for every-other bit in the 64-bit sequence. The encoder module 206 may add an additional bit or reserve the last bit for error correction. For example, the unique ID may be 0101010101010101010101-010101010101010101010101010101010101010 and the $64^{th}$ bit may be a parity bit, for example, 1 in this case to indicate that the sum of the unique ID is odd.

In some implementations, the encoder module 206 reserves a portion of the 64-bit sequence to represent additional information. For example, because the recording devices 116 may be positioned in locations far enough away from each other than they cannot all detect the audio signal at the same time, the audio generator application 104 may play the audio signal multiple times. In order to accommodate the multiple transmissions of the audio signal, the encoder module 206 may reserve the first four or last four bits of the 64-bit sequence as a transmission counter that represents a number of transmissions of the audio signal. For example, the four bits of the transmission counter may start with 0 and advance by one (or two, 10, etc.) each time the audio signal is played. The four bits may represent numbers using binary such that, for example, the 64-bit sequence ends with 0111 to represent transmission number 7. The audio generator application 104 may play the audio signal at a fixed time interval so that the synchronizing application 110 may use the fixed time interval and the count to synchronize the recordings that are associated with the unique ID.

The encoder module 206 may generate multiple audio signals to demarcate multiple locations in the recordings. For example, where the event is a movie, the audio signals may represent breaks between different scenes in the movie. In another example, the audio signals may represent different takes of the same scene. The audio generator application 104 may generate audio signals with a 64-bit sequence that includes the same unique ID and a portion reserved for a demarcation counter. The demarcation counter may represent a sequential number within the recording. For example, a movie with 10 scenes may have ten different demarcation numbers where the demarcation counter is advanced by one for each new scene.

The metadata module 204 may instruct the user interface module 208 to generate a user interface that includes a section where the user may provide information associated with the demarcation counter. For example, the user interface may include an option to define a number of scenes or provide a number of takes. In some embodiments, the unique ID may include both a transmission counter and a demarcation counter. For example, the following 64-bit sequence includes 36 bits for the unique ID, four bits for the demarcation counter that represent 10 scenes, and four bits that represent seven transmissions of the audio signal:

0101010101010101010101010101010101010101-01010101010101 1010 0111
|_____      unique    ID_____|_____
     10_____|_____7_____|

The encoder module 206 may provide the metadata and the unique ID to the synchronization application 110 to associate with recordings via the communication unit 245. The encoder module 206 may provide the unique ID to the synchronization application 110 each time the audio generator application 104 plays the audio signal. For example, a user may play the audio signal each time a new take is recorded. The encoder module 206 may transmit the metadata and the unique ID to the synchronization application 110, which updates the information stored in the database 103.

The user interface module 208 may be operable to generate a user interface. In some embodiments, the user interface module 208 may include a set of instructions executable by the processor 225 to generate the user interface. In some embodiments, the user interface module 208 may be stored in the memory 227 of the computing device 200 and can be accessible and executable by the processor 225.

The user interface may include options to provide information about a title, a scene, a take, a date, a location, a crew name, a cast name, and production notes. The options may include text fields, drop-down boxes, links, an option to upload media, etc.

Figure 2B:
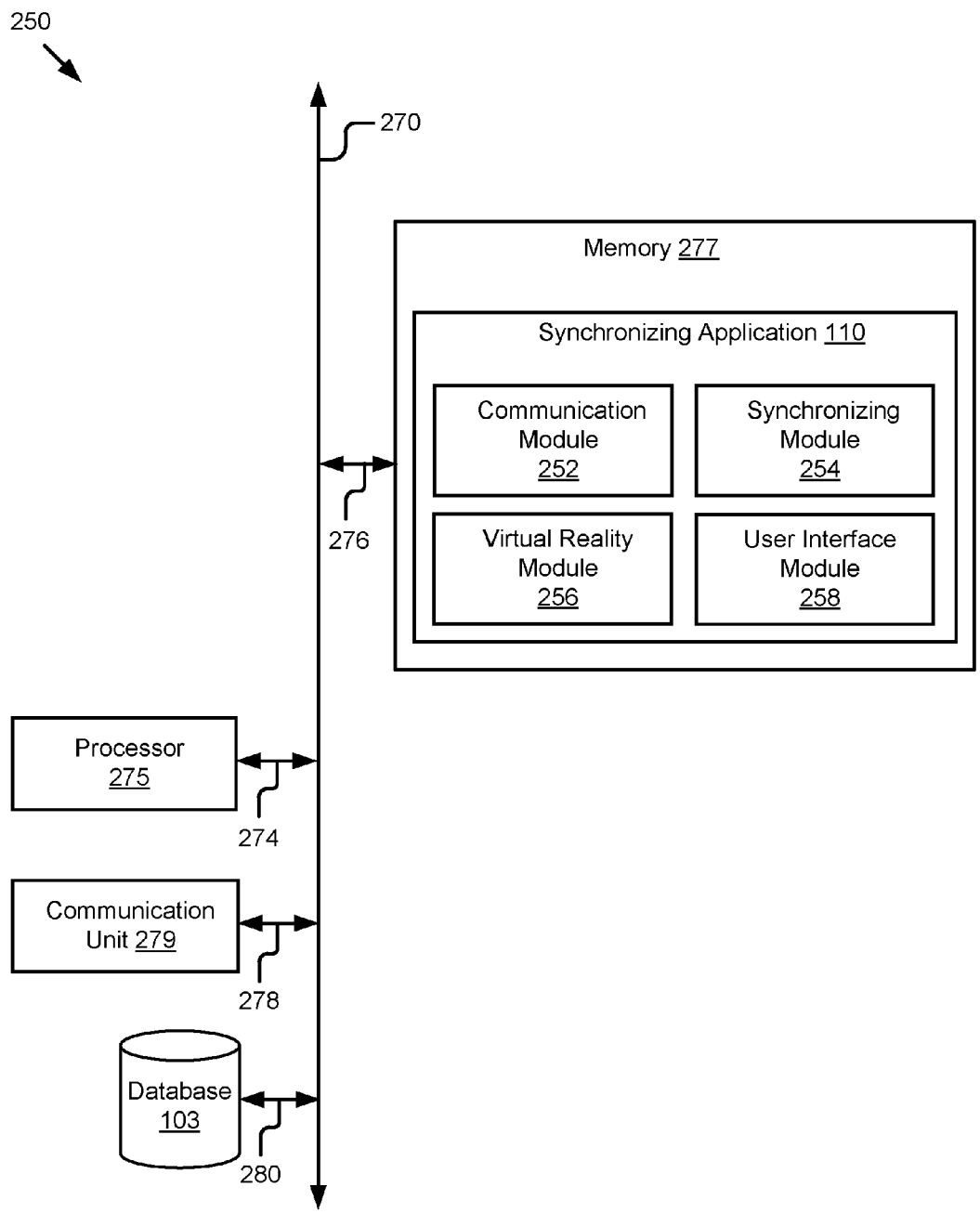
FIG. 2B is a block diagram of a device for grouping recordings.

FIG. 2B is a block diagram of a device 250 for grouping recordings. The device 250 can be, or include, or be included in the central server 101 of FIG. 1. In some embodiments, the device 250 may include a special-purpose computing device configured to provide some or all of the functionality described below with reference to FIG. 2B. For example, the device 250 can be a desktop computer.

FIG. 2B can include a synchronization application 110, a processor 275, a memory 277, a communication unit 279, and a database 103. The synchronization application 110, the processor 275, the memory 277, the communication unit 279, and the database 103 are communicatively coupled to the bus 270. The processor 275 is coupled to the bus 270 via signal line 274, the memory 277 is coupled to the bus 270 via signal line 276, and the communication unit 279 is coupled to the bus 270 via signal line 278. The processor 275, the memory 277, and the communication unit 279 are similar to the processor 225, the memory 227, and the communication unit 245 discussed above and will not be described in greater detail.

The database 103 may include storage and a database management system (DBMS). The DBMS may organize data in the storage according to instructions from the synchronization application 110. For example, the DBMS may receive instructions from the synchronization application 110 to store the recordings in the database 103 based on the recordings including a unique ID that matches a primary key in the database 103. The database 103 may be coupled to the bus 270 via signal line 280.

The synchronization application 110 includes a communication module 252 a synchronizing module 254, a virtual reality module 256, and a user interface module 258. In some embodiments, the synchronizing application 110 is part of media processing software. In other embodiments, the synchronization application 110 is independent of media processing software.

The communication module 252 can include code and routines for handling communications between the synchronization application 110 and other components of the device 250. The communication module 252 may handle communications between the synchronization application 110 and other entities in the system 100 of FIG. 1, the synchronization application 110 and other components of the device 250, and components that are part of the synchronization application 110. In some embodiments, the communication module 252 can be stored in the memory 277 of the device 250 and can be accessible and executable by the processor 275.

The synchronizing module 254 may be operable to synchronize recordings. In some embodiments, the synchronizing module 254 may include a set of instructions executable by the processor 225 to synchronize the recordings. In some embodiments, the synchronizing module 254 may be stored in the memory 277 of the computing device 200 and can be accessible and executable by the processor 275.

The synchronizing module 254 receives metadata and a unique ID from the audio generator application 104. In some embodiments where the audio generator application 104 reserves one or more portions of a 64-bit sequence (or 32-bit, or 128-bit, etc.), the synchronizing module may receive a 64-bit sequence that includes the unique ID and additional information. The synchronizing module 254 may receive updates to the metadata and/or the 64-bit sequence. For example, the synchronizing module 254 may receive updates each time the mobile device 150 plays an audio track. The synchronizing module 254 may generate a primary key that corresponds to the unique ID and save the metadata, the 64-bit sequence, and/or the unique ID to the database 103.

The synchronizing module 254 receives recordings from the recording devices 116. The recordings may be audio, video, or a mix of audio and video. The recordings may include one or more recorded audio tracks transmitted by the recording devices 116. The synchronizing module 254 identifies the audio tracks in the recordings. For example, the synchronizing module 254 searches for a 64-bit sequence (or 32-bit, 128-bit, etc.) in each of the tracks. The synchronizing module 254 may determine that the primary key matches the unique ID from the audio track in the recordings. In some embodiments, the synchronizing module 254 determines that a subset of the recordings have the same unique ID. The synchronizing module 254 may group the recordings that have the same unique ID to be associated with the primary key in the database 103. The synchronizing module 254 may provide the recordings to the database 103 to be indexed based on being associated with the primary key in the database 103.

The synchronizing module 254 may synchronize the recordings (e.g., video recordings and audio recordings) based on the location of the audio track. For example, the synchronizing module 254 may edit the recordings to all begin at the same time by cutting the beginning of the recordings and synchronizing the recordings based on a start of the audio track.

The virtual reality module 256 may be operable to generate virtual reality content. In some embodiments, the virtual reality module 256 may include a set of instructions executable by the processor 225 to generate the virtual reality content. In some embodiments, the virtual reality module 256 may be stored in the memory 277 of the computing device 200 and can be accessible and executable by the processor 275.

A two-dimensional (2D) spherical panoramic image may be used to represent a panorama of an entire scene. The virtual reality module 256 may generate two stereoscopic panorama images for two eyes to provide a stereoscopic view of the entire scene. For example, a left panoramic image may be generated for the left eye viewing and a right panoramic image may be generated for the right eye viewing.

A pixel in a panoramic image may be presented by a yaw value and a pitch value. Yaw represents rotation around the center and may be represented on the horizontal x-axis as: yaw=360°×x/width. Yaw has a value between 0° and 360°. Pitch represents up or down rotation and may be represented on the vertical y-axis as: pitch=90°×(height/2−y)/(height/2). Pitch has a value between −90° and 90°.

Typical stereoscopic systems (e.g., 3D movies) may respectively show two different planar images to two eyes to create a sense of depth. In each planar image, all pixels in the image represent a single eye viewing position. For example, all pixels in the planar image may represent a view into the same viewing direction. However, in the panoramic image described herein (the left or right panoramic image), each pixel in the panoramic image may represent a view into a slightly different direction. For example, a pixel at an x position with pitch=0° in a left panoramic image may represent an eye viewing position of the left eye as the head is rotated by the yaw indicated by the x position. Similarly, a pixel at an x position with pitch=0° in a right panoramic image represents an eye viewing position of the right eye as the head is rotated by the yaw indicated by the x position. For pitch=0° (e.g., no up and down rotations), as the head is rotated from x=0 to x=width, a blended panorama for eye viewing positions with all 360-degree head rotations in the horizontal axis may be produced.

In some implementations, the blended panorama is effective for head rotations along the horizontal axis (e.g., yaw) but not for the vertical axis (e.g., pitch). For example, when a user looks upward, the quality of the stereo view may degrade. In order to correct this deficiency, the interocular distance may be adjusted based on the current pitch value. For example, if pitch≠0°, the interocular distance associated with the pitch may be adjusted as: interocular distance=max(interocular distance)×cos(pitch), where max(interocular distance) represents the maximum value of the interocular distance (e.g., the interocular distance is at its maximum when pitch=0°). In some examples, the maximum value of the interocular distance may be about 60 millimeters. In other examples, the maximum value of the interocular distance may have a value greater than 60 millimeters or less than 60 millimeters.

The virtual reality module 256 may construct a left camera mapping map for each pixel in a left panoramic image. For example, for a pixel in a left panoramic image that represents a point in a panorama, the left camera mapping map may identify matching camera modules from a camera array with spherical modules that have each a better view for the point in the panorama than other camera modules. Thus, the left camera mapping map may map pixels in a left panoramic image to matching camera modules that have better views for the corresponding pixels.

For each pixel in a left panoramic image that represents a point in a panorama, the virtual reality module 256 may determine a yaw, a pitch, and an interocular distance using the above mathematical expressions (1), (2), and (3), respectively. The virtual reality module 256 may use the yaw and pitch to construct a vector representing a viewing direction of the left eye (e.g., a left viewing direction) to the corresponding point in the panorama.

Similarly, the virtual reality module 256 may construct a right camera mapping map that identifies a corresponding matching camera module for each pixel in a right panoramic image. For example, for a pixel in a right panoramic image that represents a point in a panorama, the right camera mapping map may identify a matching camera module that has a better view for the point in the panorama than other camera modules. Thus, the right camera mapping map may map pixels in a right panoramic image to matching camera modules that have better views for the corresponding pixels.

For each pixel in a right panoramic image that represents a point in a panorama, the virtual reality module 256 may determine a yaw, a pitch, and an interocular distance using the above mathematical expressions, respectively. The virtual reality module 256 may use the yaw and pitch to construct a vector representing a viewing direction of the right eye (e.g., a right viewing direction) to the corresponding point in the panorama.

The virtual reality module 256 may receive synchronized video recordings from the synchronizing module 254 that describes image frames from the various camera modules in a camera array. The virtual reality module 256 identifies a location and timing associated with each of the camera modules and synchronizes the image frames based on locations and timings of the camera modules. The virtual reality module 256 synchronizes image frames captured by different camera modules at the same time frames.

For example, the virtual reality module 256 receives a first video recording with first images from a first camera module and a second video recording with second images from a second camera module. The virtual reality module 256 identifies that the first camera module is located at a position with yaw=0° and pitch=0° and the second camera module is located at a position with yaw=30° and pitch=0°. The virtual reality module 256 synchronizes the first images with the second images by associating a first image frame from the first images at a time frame $T=T_0$ with a second image frame from the second images at the time frame $T=T_0$, a third image frame from the first images at a time frame $T=T_1$ with a fourth image frame from the second images at the time frame $T=T_1$, and so on and so forth.

The virtual reality module 256 may construct a stream of left panoramic images from the image frames based on the left camera mapping map. For example, the virtual reality module 256 identifies matching camera modules listed in the left camera mapping map. The virtual reality module 256 constructs a first left panoramic image $PI_{L,0}$ for a first time frame $T=T_0$ by stitching together image frames captured at the first time frame $T=T_0$ by the matching camera modules. The virtual reality module 256 constructs a second left panoramic image $PI_{L,1}$ at a second time frame $T=T_1$ using image frames captured at the second time frame $T=T_1$ by the matching camera modules, and so on and so forth. The virtual reality module 256 constructs the stream of left panoramic images to include the first left panoramic image $PI_{L,0}$ at the first time frame $T=T_0$, the second left panoramic image $PI_{L,1}$ at the second time frame $T=T_1$, and other left panoramic images at other corresponding time frames.

Specifically, for a pixel in a left panoramic image $PI_{L,i}$ at a particular time frame $T=T_i$ (i=0, 1, 2, . . . ), the virtual reality module 256: (1) identifies a matching camera module from the left camera mapping map; and (2) configures the pixel in the left panoramic image $PI_{L,i}$ to be a corresponding pixel from an image frame captured by the matching camera module at the same time frame $T=T_i$. The pixel in the left panoramic image $PI_{L,i}$ and the corresponding pixel in the image frame of the matching camera module may correspond to the same point in the panorama. For example, for a pixel location in the left panoramic image $PI_{L,i}$ that corresponds to a point in the panorama, the virtual reality module 256: (1) retrieves a pixel that also corresponds to the same point in the panorama from the image frame captured by the matching camera module at the same time frame $T=T_i$; and (2) places the pixel from the image frame of the matching camera module into the pixel location of the left panoramic image $PI_{L,i}$.

Similarly, the virtual reality module 256 constructs a stream of right panoramic images from the image frames based on the right camera mapping map by performing operations similar to those described above with reference to the construction of the stream of left panoramic images. For example, the virtual reality module 256 identifies matching camera modules listed in the right camera mapping map. The virtual reality module 256 constructs a first right panoramic image $PI_{R,0}$ for a first time frame $T=T_0$ by stitching together image frames captured at the first time frame $T=T_0$ by the matching camera modules. The virtual reality module 256 constructs a second right panoramic image $PI_{R,1}$ at a second time frame $T=T_1$ using image frames captured at the second time frame $T=T_1$ by the matching camera modules, and so on and so forth. The virtual reality module 256 constructs the stream of right panoramic images to include the first right panoramic image $PI_{R,0}$ at the first time frame $T=T_0$, the second right panoramic image $PI_{R,1}$ at the second time frame $T=T_1$, and other right panoramic images at other corresponding time frames.

Specifically, for a pixel in a right panoramic image $PI_{R,i}$ at a particular time frame $T=T_i$ (i=0, 1, 2, . . . ), the virtual reality module 256: (1) identifies a matching camera module from the right camera mapping map; and (2) configures the pixel in the right panoramic image $PI_R$ to be a corresponding pixel from an image frame captured by the matching camera module at the same time frame $T=T_i$. The pixel in the right panoramic image $PI_{R,i}$ and the corresponding pixel in the image frame of the matching camera module may correspond to the same point in the panorama.

The virtual reality module 256 may generate virtual reality content from the stream of left panoramic images, the stream of right panoramic images, and the audio data. The virtual reality module 256 may compress the stream of left panoramic images and the stream of right panoramic images to generate a stream of compressed 3D video data using video compression techniques. In some implementations, within each stream of the left or right panoramic images, the virtual reality module 256 may use redundant information from one frame to a next frame to reduce the size of the corresponding stream. For example, with reference to a first image frame (e.g., a reference frame), redundant information in the next image frames may be removed to reduce the size of the next image frames. This compression may be referred to as temporal or inter-frame compression within the same stream of left or right panoramic images.

Alternatively or additionally, the virtual reality module 256 may use one stream (either the stream of left panoramic images or the stream of right panoramic images) as a reference stream and may compress the other stream based on the reference stream. This compression may be referred to as inter-stream compression. For example, the virtual reality module 256 may use each left panoramic image as a reference frame for a corresponding right panoramic image and may compress the corresponding right panoramic image based on the referenced left panoramic image.

In some implementations, the virtual reality module 256 may encode the stream of 3D video data (or compressed 3D video data) and audio data to form a stream of VR content. For example, the virtual reality module 256 may compress the stream of 3D video data using h.264 and the stream of 3D audio data using advanced audio coding (AAC). In another example, the virtual reality module 256 may compress the stream of 3D video data and the stream of 3D audio data using a standard MPEG format.

The user interface module 258 may be operable to generate a user interface. In some embodiments, the user interface module 258 may include a set of instructions executable by the processor 225 to generate the user interface. In some embodiments, the user interface module 258 may be stored in the memory 277 of the computing device 200 and can be accessible and executable by the processor 275.

The user interface module 258 may generate a user interface that includes information about the recordings that are associated with the same unique ID. The user interface may include an option for a user to add additional information, such as more information about the metadata. For example, the user may be able to define a title for the recordings. In some embodiments, the user interface may include an option to generate virtual reality content from the synchronized recordings.

Figure 3:
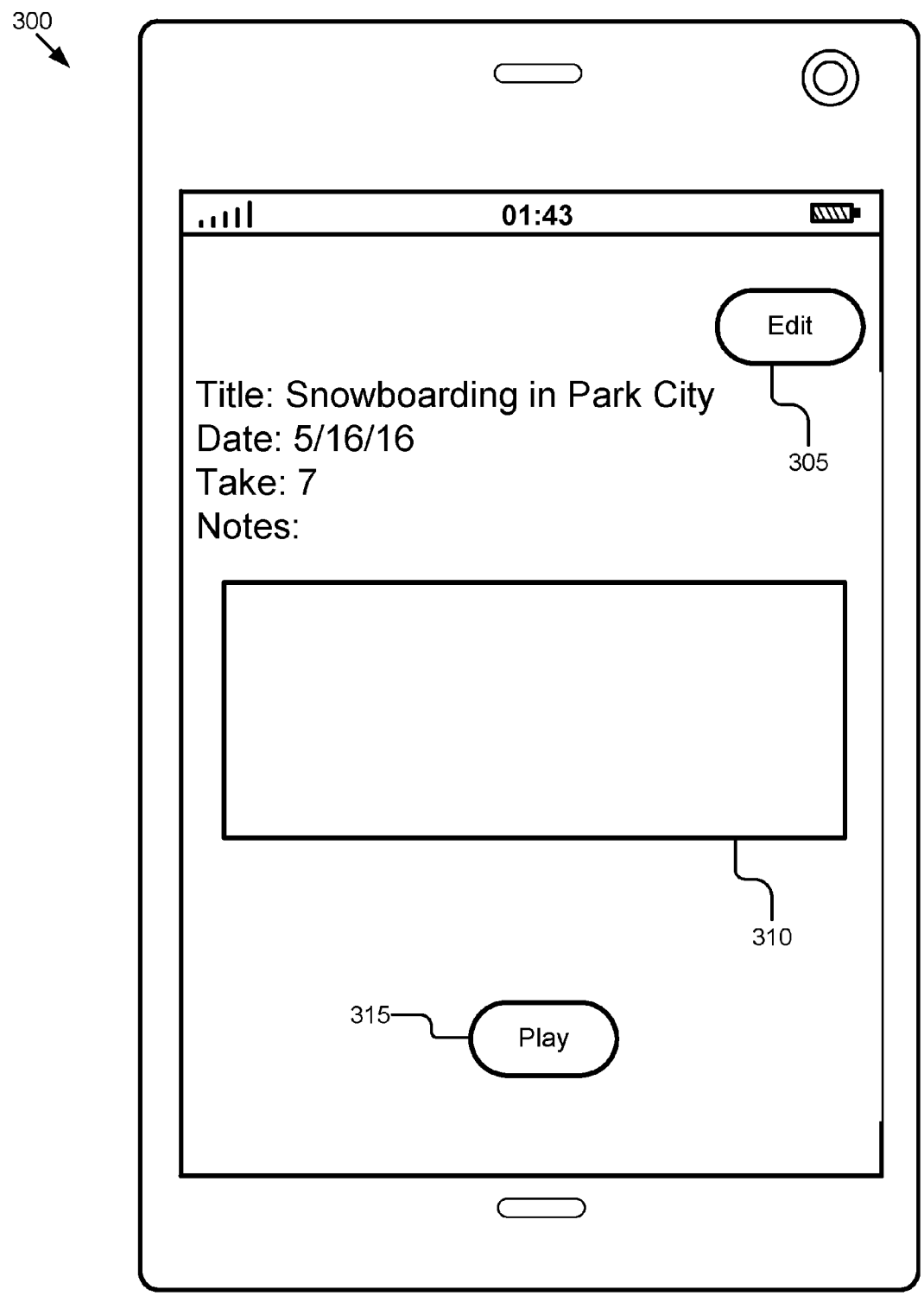
FIG. 3 is an example graphical user interface associated with an audio generator application that includes an option to play an audio track.

FIG. 3 is an example graphical user interface 300 associated with an audio generator application that includes an option to play an audio track. In this example, the user interface module 208 of the audio generator application 104 generates a user interface that includes metadata that is input by a user. The user may edit the metadata by selecting the edit button 305. The user may provide notes by clicking within the notes field text box 310. The user may cause the mobile device 150 to play an audio track by selecting the play button 315.

Figure 4:
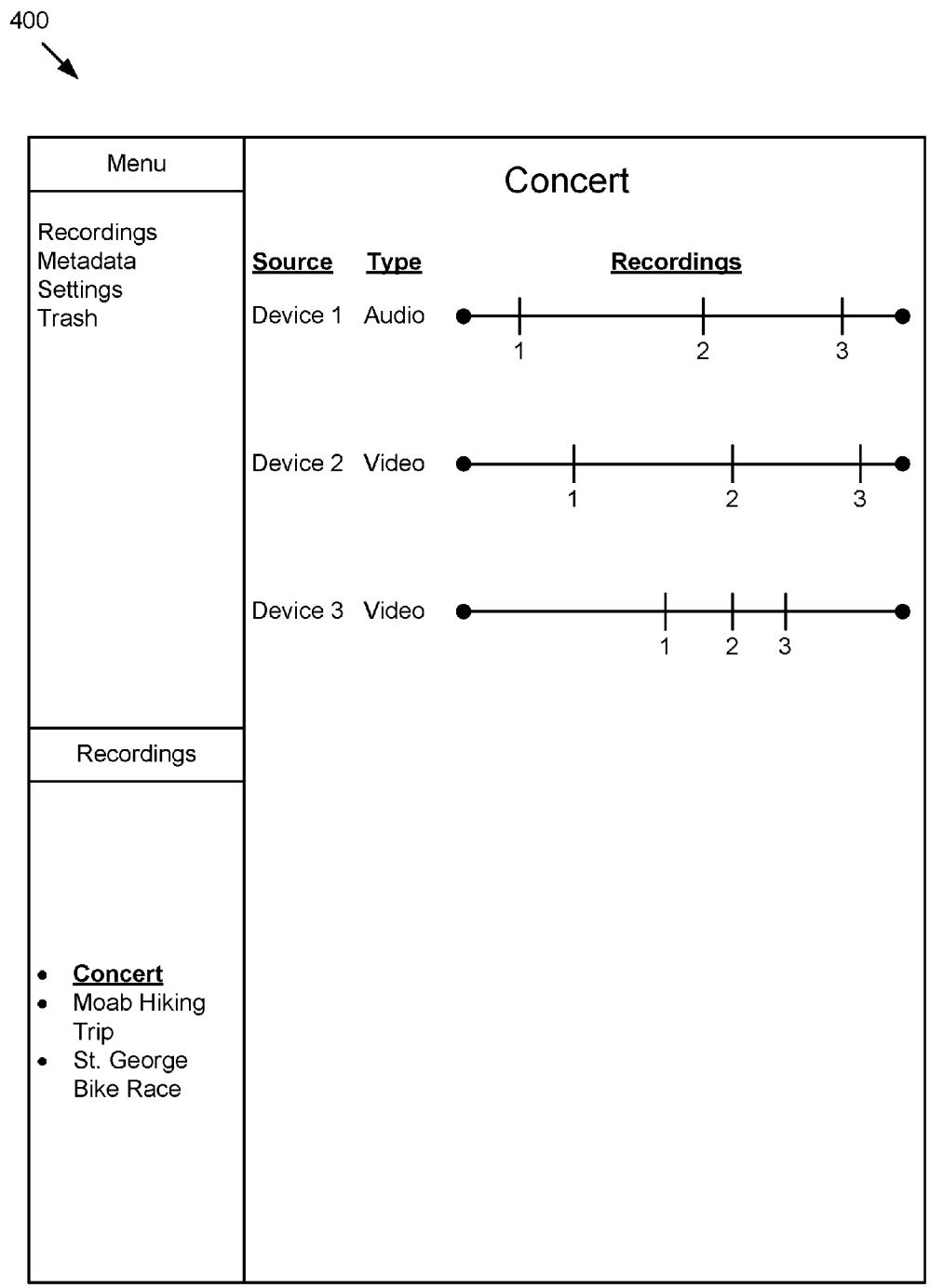
FIG. 4 is an example graphical user interface associated with a synchronizing application that includes multiple recordings.

FIG. 4 is an example graphical user interface 300 associated with a synchronizing application that includes multiple recordings. In this example, the synchronization application 110 generates a graphical user interface 400 that includes menu options for selecting information about recordings, metadata, settings, and trash. Here, the recordings are selected and recordings associated with the user are displayed below the recordings header. The recordings are labeled "Concert," "Moab Hiking Trip," and "St. George Bike Race." The "Concert" is bolded and underlined, indicating that it was selected. Three recordings are associated with the "Concert." The first recording is an audio track associated with a first recording device. The second recording is a video track associated with a second recording device. The third recording is a video track associated with a third recording device.

The recordings each include three markers. The markers could represent, for example, breaks between three different artists performing at the concert. In some embodiments, the synchronization application 110 synchronizes the recordings based on the locations of the markers.

Figure 5:
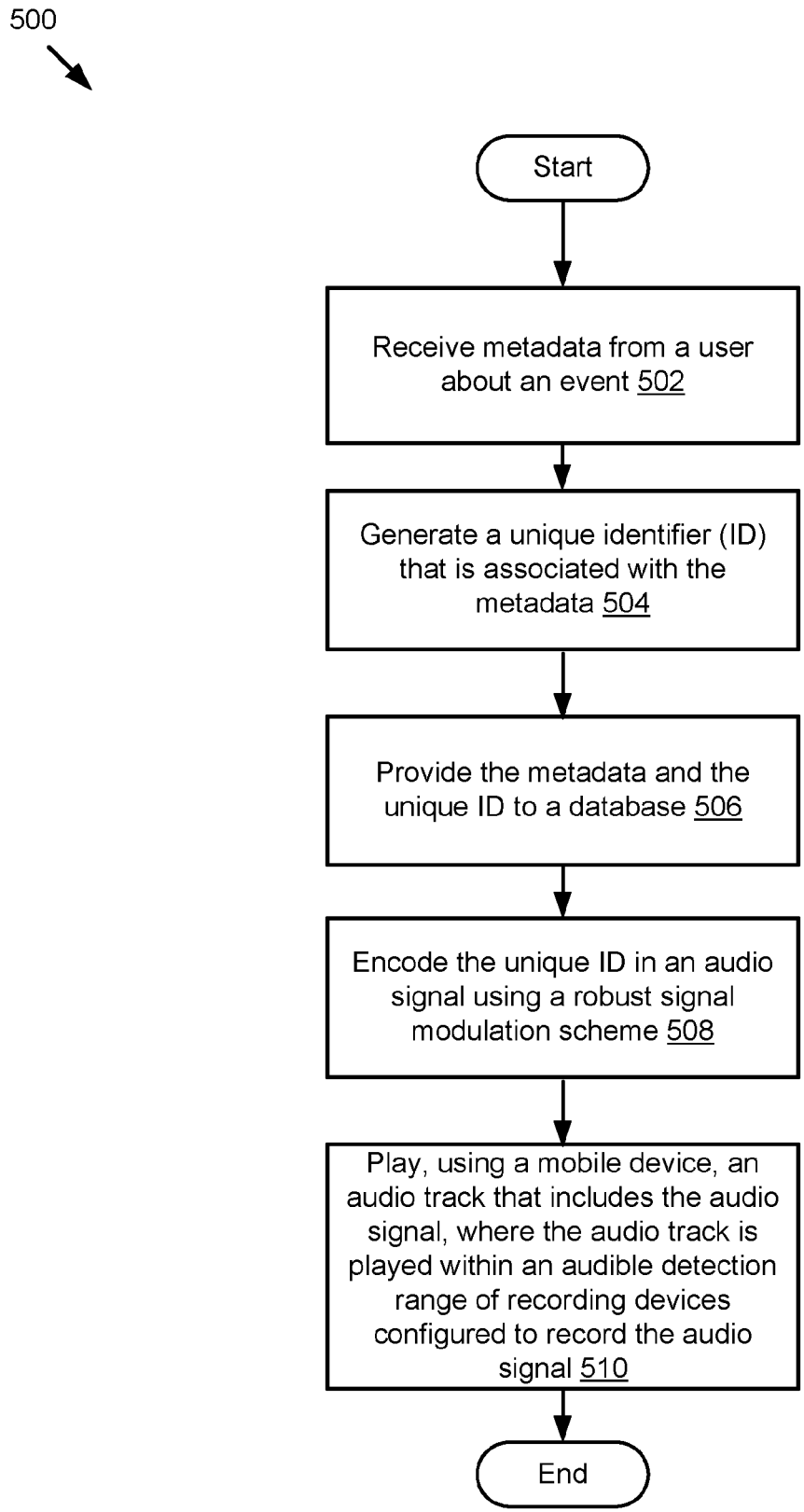
FIG. 5 is a flowchart of an example method for generating an audio track with an encoded audio signal.

FIG. 5 is a flowchart of an example method 500 for generating an audio track with an encoded audio signal. The method may be performed by an audio generator application 104 stored on the mobile device 150 of FIG. 1. The mobile device 150 may be a special-purpose computing device configured to provide some or all of the functionality described with reference to FIG. 5.

At block 502, metadata is received about an event. At block 504, a unique ID is generated that is associated with the metadata. At block 506, the metadata and the unique ID are provided to a database. At block 508, the unique ID is encoded in an audio signal using a robust signal modulation scheme. At block 510, a mobile device plays an audio track that includes the audio signal, where the audio track is played within an audible detection range of recording devices configured to record the audio signal.

Figure 6:
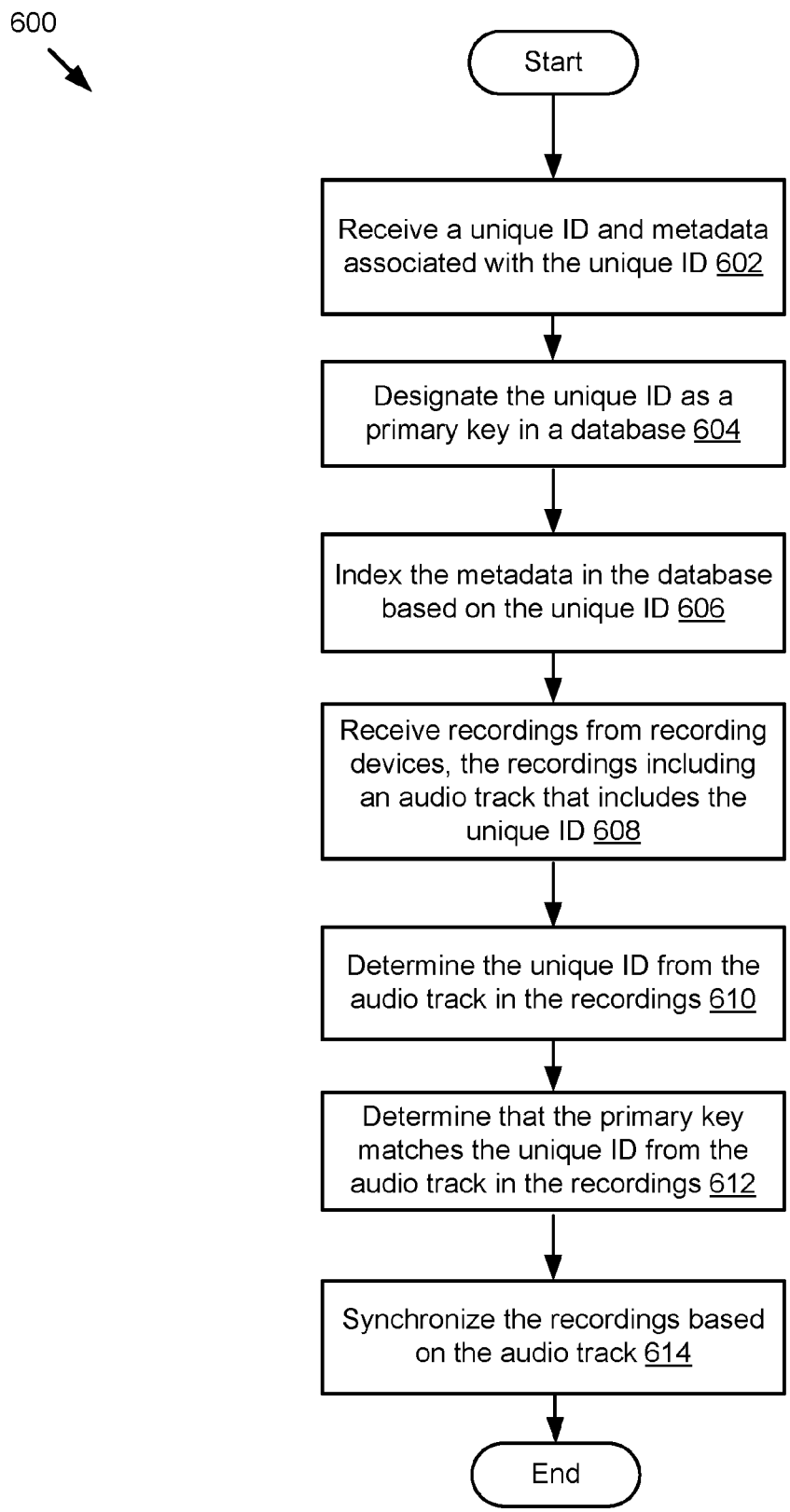
FIG. 6 is a flowchart of an example method for grouping recordings.

FIG. 6 is a flowchart of an example method 600 for grouping recordings. The method may be performed by a synchronization application 110 stored on the central server 101 of FIG. 1. The central server 101 may be a special-purpose computing device configured to provide some or all of the functionality described with reference to FIG. 6.

At block 602, a unique ID and metadata associated with the unique ID are received. At block 604, the unique ID is designated as a primary key in a database. At block 606, the metadata in the database is indexed based on the unique ID. At block 608, recordings are received from recording devices, the recordings including an audio track that includes the unique ID. At block 610, the unique ID is determined from the audio track in the recordings. At block 612, the primary key is determined to match the unique ID from the audio signal in the recordings. At block 614, the recordings are synchronized based on the audio track.

Figure 7A:
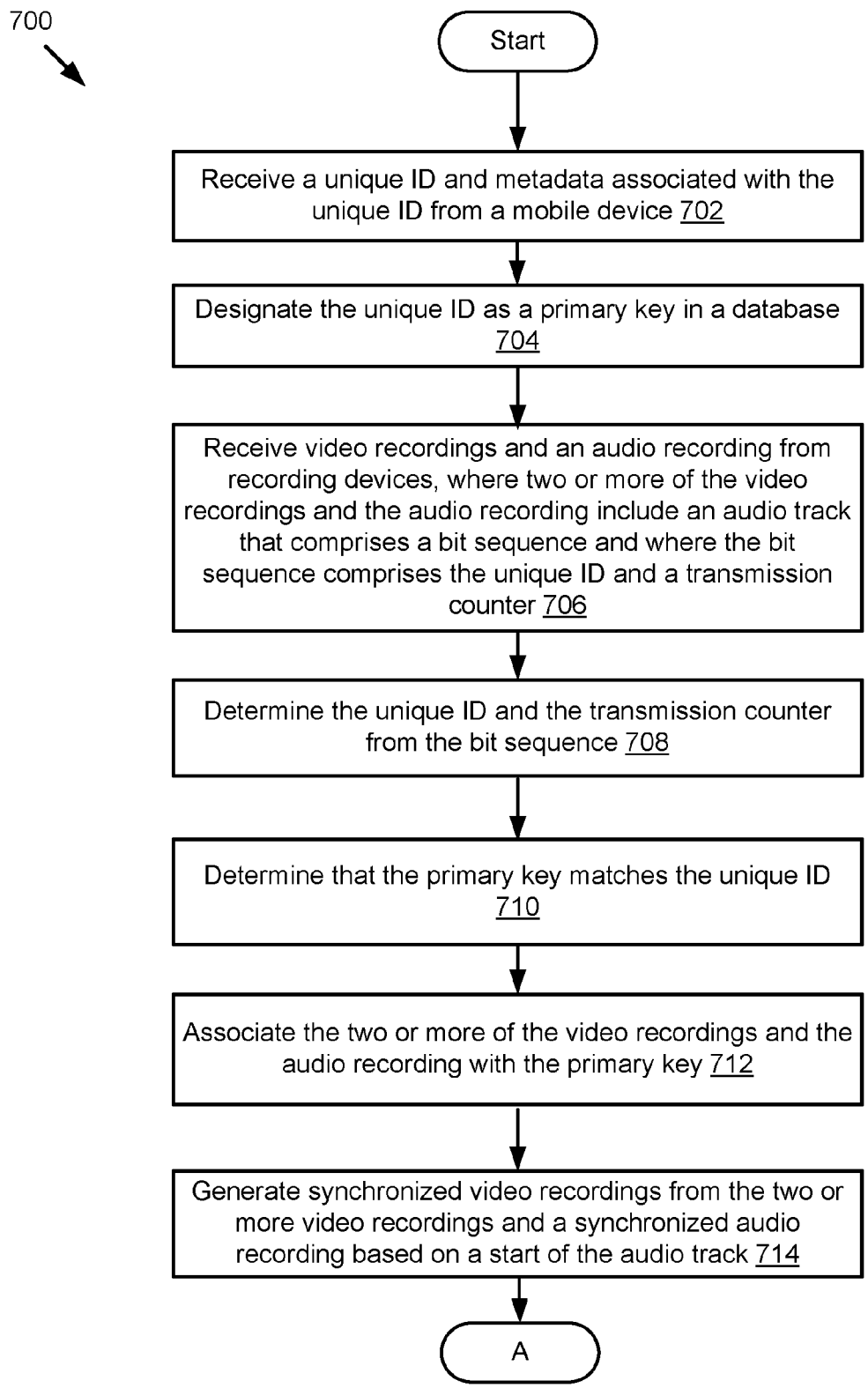
FIG. 7A-7B are flowcharts of an example method for generating virtual reality content.
Figure 7B:
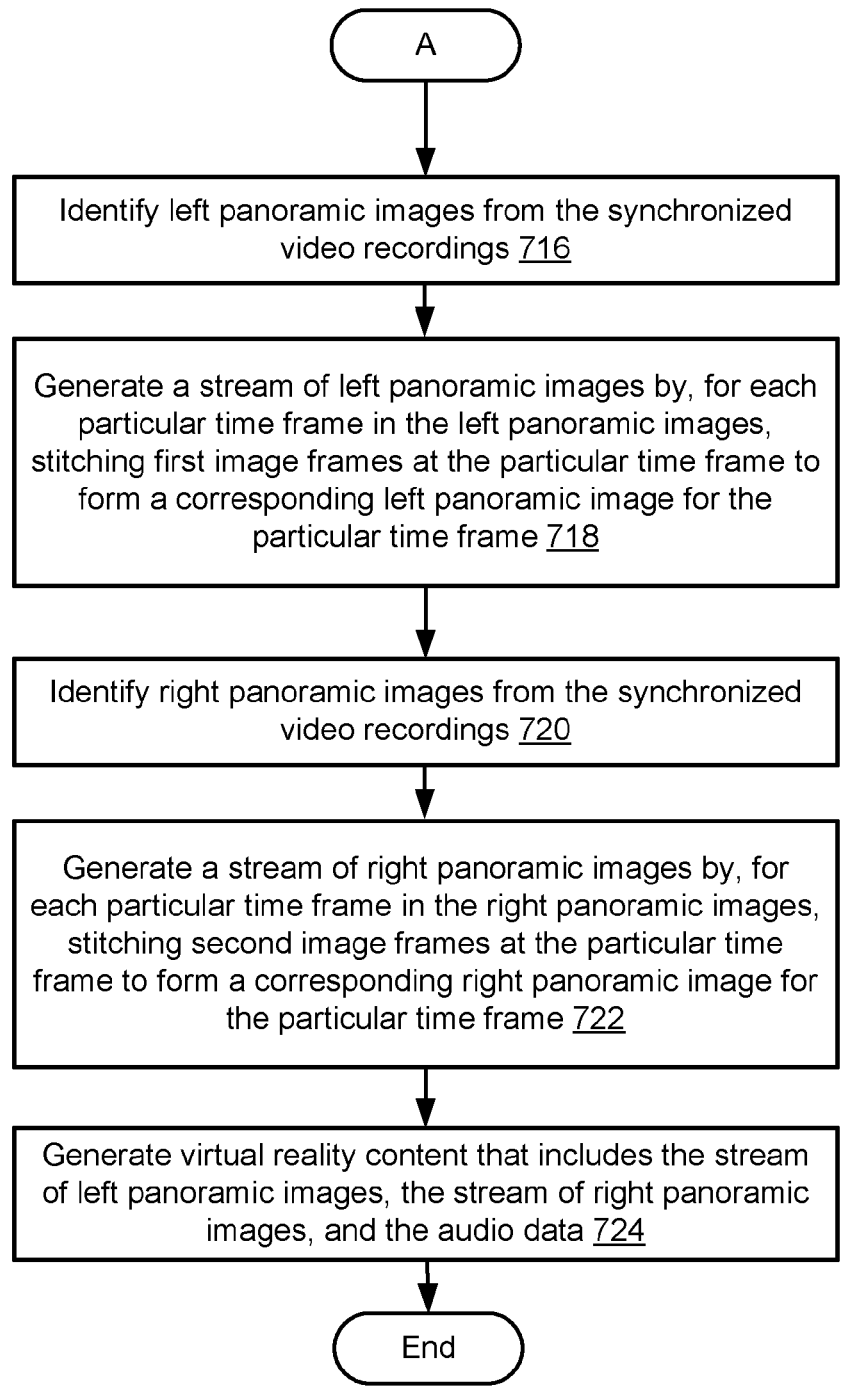

FIG. 7A-7B are flowcharts of an example method 700 for generating virtual reality content. The method may be performed by a synchronization application 110 stored on the central server 101 of FIG. 1. The central server 101 may be a special-purpose computing device configured to provide some or all of the functionality described with reference to FIG. 7.

At block 702, a unique ID and metadata associated with the unique ID are received from a mobile device. At block 704, the unique ID is designated as a primary key in a database. At block 706, video recordings and an audio recording are received from recording devices where two or more of the video recordings and the audio recording include an audio track that comprises a bit sequence and where the bit sequence comprises the unique ID and a transmission counter. At block 708, the unique ID and the transmission counter are determined from the bit sequence. At block 710, the primary key is determined to match the unique ID. At block 712, two or more of the video recordings and the audio recording are associated with the primary key.

At block 714, synchronized video recordings from the two or more video recordings and a synchronized audio recording are generated based on a start of the audio track. At block 716, left panoramic images are identified from the synchronized video recordings. At block 718, a stream of left panoramic images are generated by, for each particular time frame in the left panoramic images, stitching first image frames at the particular time frame to form a corresponding left panoramic image for the particular time frame. At block 720, right panoramic images are identified from the synchronized video recordings. At block 722, a stream of right panoramic images are generated by, for each particular time frame in the right panoramic images, stitching second image frames at the particular time frame to form a corresponding right panoramic image for the particular time frame. At block 724, virtual reality content is generated that includes the stream of left panoramic images, the stream of right panoramic images, and the audio data.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the embodiments can be described above primarily with reference to user interfaces and particular hardware. However, the embodiments can apply to any type of computing device that can receive data and commands, and any peripheral devices providing services.

Reference in the specification to "some embodiments" or "some instances" means that a particular feature, structure, or characteristic described in connection with the embodiments or instances can be included in at least one embodiment of the description. The appearances of the phrase "in some embodiments" in various places in the specification are not necessarily all referring to the same embodiments.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The embodiments of the specification can also relate to a processor for performing one or more steps of the methods described above. The processor may be a special-purpose processor selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some preferred embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited, to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks.

Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A method of generating an encoded audio signal, the method comprising:
   receiving metadata from a user about an event;
   generating a unique identifier (ID) that is associated with the metadata;
   providing the metadata and the unique ID to a database;
   encoding the unique ID in an audio signal using a robust signal modulation scheme; and
   playing, using a mobile device, an audio track that includes the audio signal, wherein the audio track is played within an audible detection range of recording devices configured to record the audio signal.

2. The method of claim 1, wherein the metadata includes at least one of a title, a scene, a take, a date, a location, a crew name, a cast name, and production notes.

3. The method of claim 1, wherein the robust signal modulation scheme includes frequency-shift keying.

4. The method of claim 1, further comprising enhancing a robustness of the robust signal modulation scheme using at least one of parity bits, a cyclic redundancy check, and Reed-Solomon codes.

5. The method of claim 1, further comprising playing the audio track repeatedly to ensure robust transmission and to allow time for the mobile device playing the audio track to be transmitted to the recording devices to be within the audible detection range of the recording devices configured to record the audio track.

6. The method of claim 5, wherein the mobile device is a smartphone.

7. The method of claim 1, wherein the audio signal is a 64-bit binary sequence.

8. The method of claim 7, wherein:
   a part of the 64-bit binary sequence is reserved as a transmission counter; and
   playing, the audio track includes playing the audio track multiple times and modifying the part of the 64-bit binary sequence reserved as the transmission counter to represent an increase by one each time the audio track is played.

9. The method of claim 1, wherein the audio signal is a binary sequence and each bit for each position in the binary sequence is assigned a unique pseudorandom sequence.

10. The method of claim 1, wherein the recording devices include at least one of a video recorder, a microphone, and a camera.

11. The method of claim 1, further comprising generating multiple audio markers to demarcate multiple locations in a recordings.

12. A method of grouping a set of recordings, the method comprising:
   receiving a unique identifier (ID) and metadata associated with the unique ID;
   designating the unique ID as a primary key in a database;
   indexing the metadata in the database based on the unique ID;
   receiving a first recording and a second recording each including an audio track that includes the unique ID and a timing of the audio track;
   determining the unique ID from the audio track in the first recording and the second recording;
   determining that the primary key matches the unique ID from the audio track in the first recording and the second recording; and
   synchronizing the first recording and the second recording based on the timing of the audio track in the first recording and the second recording.

13. The method of claim 12, further comprising generating virtual reality content from the synchronized first recording and second recording.

14. The method of claim 13, wherein the unique ID is part of a 64-bit binary sequence and determining the unique ID from the audio track in the first recording and the second recording includes searching for the 64-bit binary sequence.

15. The method of claim 14, wherein a part of the 64-bit binary sequence is reserved as a transmission counter and modified to represent an increase by one each time the audio track is played and further comprising:
   identifying the transmission counter from the unique ID; and
   synchronizing the first recording and the second recording based on a number represented by the counter.

16. The method of claim 12, wherein the first recording includes at least one of audio and video.

17. The method of claim 12, wherein the first recording is associated with a first recording device, the second recording is associated with a second recording device, and the first recording and the second recording are associated with a same event.

18. The method of claim 12, wherein the first recording and the second record each include a demarcation counter to demarcate multiple locations in the first recording and the second recording and further comprising identifying the demarcation counter in the first recording and the second recording.

19. A system comprising:
- one or more first processors executing an audio generator application stored on a first memory, the audio generator application configured to:
  - receive metadata from a user about an event;
  - generate a unique identifier (ID) that is associated with the metadata;
  - provide the metadata and the unique ID to a database;
  - encode the unique ID in an audio signal using a robust signal modulation scheme; and
  - play, using a mobile device, an audio track that includes the audio signal, wherein the audio track is played within an audible detection range of recording devices configured to record the audio signal; and
- one or more second processors executing a synchronization application stored on a second memory, the synchronization application configured to:
  - receive the unique ID and metadata associated with the unique ID;
  - designate the unique ID as a primary key in a database;
  - index the metadata in the database based on the unique ID;
  - receive recordings from recording devices, the recordings including the audio track that includes the unique ID;
  - determine the unique ID from the audio track in the recordings;
  - determine that the primary key matches the unique ID from the audio track in the recordings; and
  - synchronize the recordings based on the audio track.

20. A method of grouping a set of recordings, the method comprising:
- receiving a unique identifier (ID) and metadata associated with the unique ID from a mobile device;
- designating the unique ID as a primary key in a database;
- receiving video recordings and an audio recording from recording devices, wherein two or more of the video recordings and the audio recording include an audio track that comprises a bit sequence and wherein the bit sequence comprises the unique ID and a transmission counter;
- determining the unique ID and the transmission counter from the bit sequence;
- determining that the primary key matches the unique ID;
- associating the two or more of the video recordings and the audio recording with the primary key;
- generating synchronized video recordings from the two or more video recordings and a synchronized audio recording based on a start of the audio track;
- identifying left panoramic images from the synchronized video recordings;
- generating a stream of left panoramic images by, for each particular time frame in the left panoramic images, stitching first image frames at the particular time frame to form a corresponding left panoramic image for the particular time frame;
- identifying right panoramic images from the synchronized video recordings;
- generating a stream of right panoramic images by, for each particular time frame in the right panoramic images, stitching second image frames at the particular time frame to form a corresponding right panoramic image for the particular time frame; and
- generating virtual reality content that includes the stream of left panoramic images, the stream of right panoramic images, and the synchronized audio recording.

* * * * *